United States Patent [19]

Anderson et al.

[11] Patent Number: 4,555,459
[45] Date of Patent: Nov. 26, 1985

[54] BATTERY GRIDS

[75] Inventors: Carl Anderson, Hamburg, Pa.; Richard H. Craig, Trenton, N.J.

[73] Assignee: General Battery Corporation, Reading, Pa.

[21] Appl. No.: 571,862

[22] Filed: Jan. 18, 1984

[51] Int. Cl.$^4$ ............................................. H01M 4/73
[52] U.S. Cl. ..................................... 429/211; 429/241
[58] Field of Search ................................. 429/211, 241

[56] References Cited

U.S. PATENT DOCUMENTS

| | | | |
|---|---|---|---|
| D. 31,367 | 8/1899 | Porter | D13/10 |
| D. 31,368 | 8/1899 | Porter | D13/10 |
| D. 32,160 | 1/1900 | Storey | D13/10 |
| D. 32,366 | 3/1900 | Conrad | D13/10 |
| D. 35,030 | 9/1901 | Conrad | D13/10 |
| D. 35,072 | 9/1901 | Hatch | D13/10 |
| D. 56,653 | 11/1920 | Cook | D13/10 |
| D. 114,116 | 10/1938 | Emanuel | D13/10 |
| 809,742 | 1/1906 | Perry | 429/211 |
| 1,126,671 | 1/1915 | Wilson | 429/245 |
| 1,214,210 | 1/1917 | Mills | 429/211 |
| 1,228,250 | 5/1917 | Skinner | 429/241 |
| 1,437,468 | 12/1922 | Ford | 429/211 |
| 1,608,469 | 11/1926 | Daniel | 429/241 |
| 2,756,269 | 7/1956 | Harrison et al. | 429/241 |
| 3,690,950 | 9/1972 | Wheadon et al. | 136/37 |
| 3,989,539 | 11/1976 | Grabb | 429/241 |
| 4,118,553 | 10/1978 | Buckethal et al. | 429/234 |
| 4,221,852 | 9/1980 | Qureshi | 429/211 |
| 4,320,183 | 3/1982 | Qureshi | 429/211 |

FOREIGN PATENT DOCUMENTS

| | | | |
|---|---|---|---|
| 2831127 | 1/1979 | Fed. Rep. of Germany | 429/241 |
| 0584371 | 12/1977 | U.S.S.R. | 429/241 |

OTHER PUBLICATIONS

"Grid Alloy Trends", Oct., 1983 edition of The Battery Man, p. 23.

Primary Examiner—Donald L. Walton
Attorney, Agent, or Firm—Benasutti and Murray

[57] ABSTRACT

A lightweight battery grid having an array of grid wires arranged to define a plurality of parallelogram of substantially equal size; whereby a battery plate having substantially equal paste pellets may be formed.

14 Claims, 9 Drawing Figures

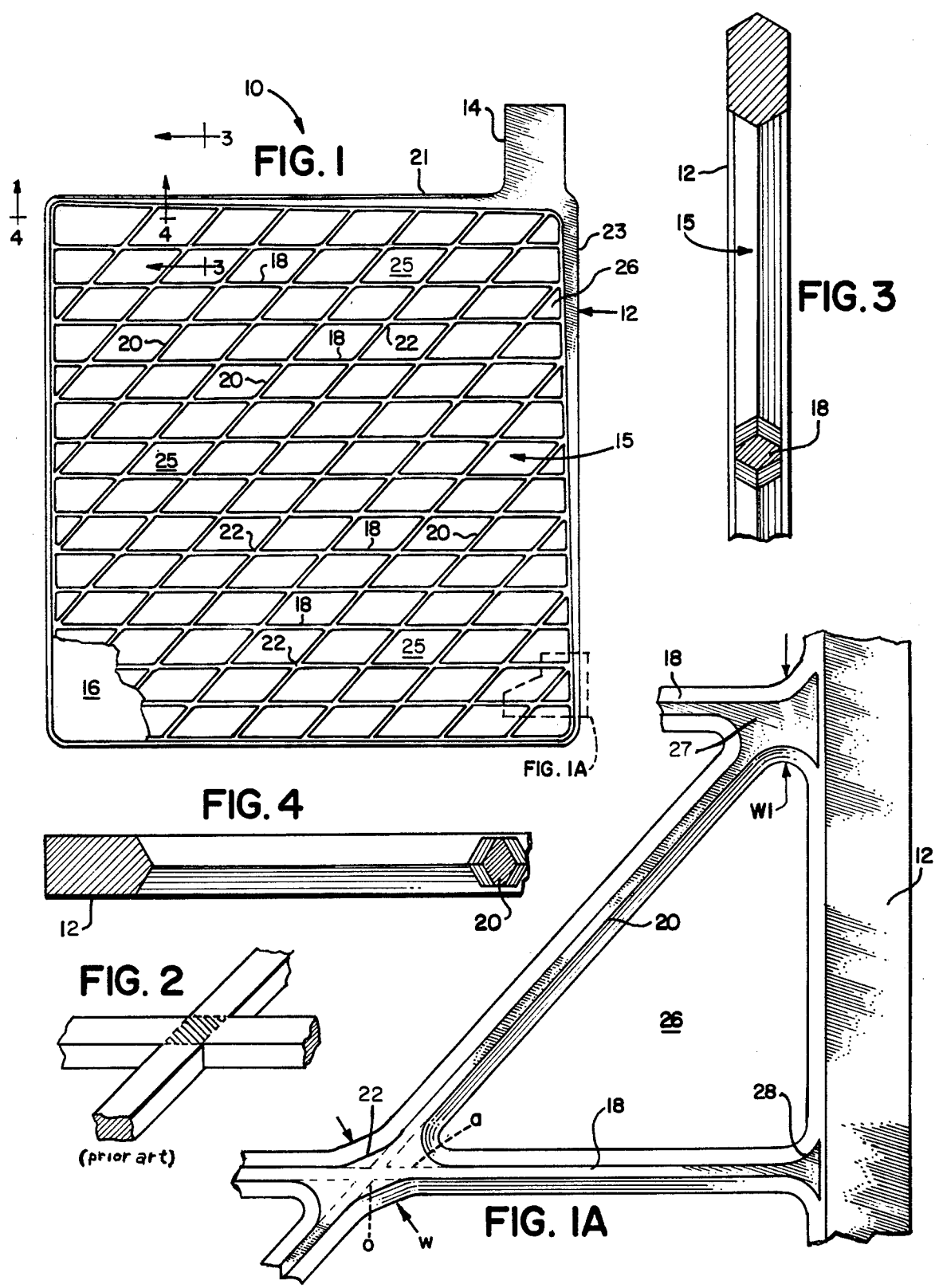

BATTERY GRIDS

The present invention relates to grids for lead-acid storage batteries.

BACKGROUND OF THE INVENTION

Lead-acid storage batteries are well known in the art. Conventionally, each cell of such batteries contains an element having a plurality of battery plates which are electrically connected to define the positive and negative electrodes of the cell. Battery plates are made by pasting active material onto a grid; the type of active material determines whether the plate will be positive or negative. Within each plate the grid serves as a support for the active material as well as a conductor of electricity to and from the active material.

Two principle concerns in manufacturing battery grids are the selection of a grid alloy and the design of the grid structure. The selection of a grid alloy is based upon such factors as strength, castability, conductivity, and cost. Improvements in the castibility of grid alloys has made possible grid designs which are thinner and lighter in weight. One alloy having improved castability is disclosed in U.S. Pat. No. 4,376,093 and may be employed in the manufacture of battery grids in accordance with the teachings of the present invention. It is highly desirable to utilize the improved properties of the newer grid materials in providing an improved grid structure for battery grids.

The design of the grid structure is a predominant factor in the grid's operating efficiency. Consideration must be given to minimizing grid weight, minimizing internal resistance, insuring ease of fabrication, insuring structural integrity, and providing a geometry suitable for holding the active material in an efficient manner. The thickness and weight of the grids is directly related to the weight and power of the battery cells which are produced.

SUMMARY AND OBJECTS OF THE INVENTION

The present invention discloses improvements for battery grids in both the geometry of the grid design as well as in the grid wire structure. A grid wire network of horizontal and diagonal wires is disposed within a rectangular frame thereby providing a network of substantially uniform parallelogramatic openings for receiving active material. The angles between the intersecting grid wires are selectively filled to enlarge the size of the grid wire intersections.

It is an object of the present invention to provide improved battery grids. In particular it is an object of the present invention to provide a grid design comprising a network of intersecting grid wires having enlarged intersections for enhancing both electrical efficiency and castability of the grid.

It is another object of the present invention to provide a light weight battery grid which efficiently serves as a conductor for active material pasted thereon.

Other objects and advantages of the present invention will become apparent from the following portion of the specification and from the accompanying drawings.

BRIEF DESCRIPTION OF THE DRAWINGS

FIG. 1 is an elevated view of a battery grid made in accordance with the teachings of the present invention;

FIG. 1A is an enlarged fragmentary view of that portion of the battery grid shown in FIG. 1;

FIG. 2 is a fragmentary perspective view of the conventional prior art grid wire intersection;

FIG. 3 is a sectional view taken along line 3—3 of the battery grid shown in FIG. 1;

FIG. 4 is a sectional view taken along line 4—4 of the battery grid shown in FIG. 1;

DETAILED DESCRIPTION OF THE INVENTION

Figure 5:
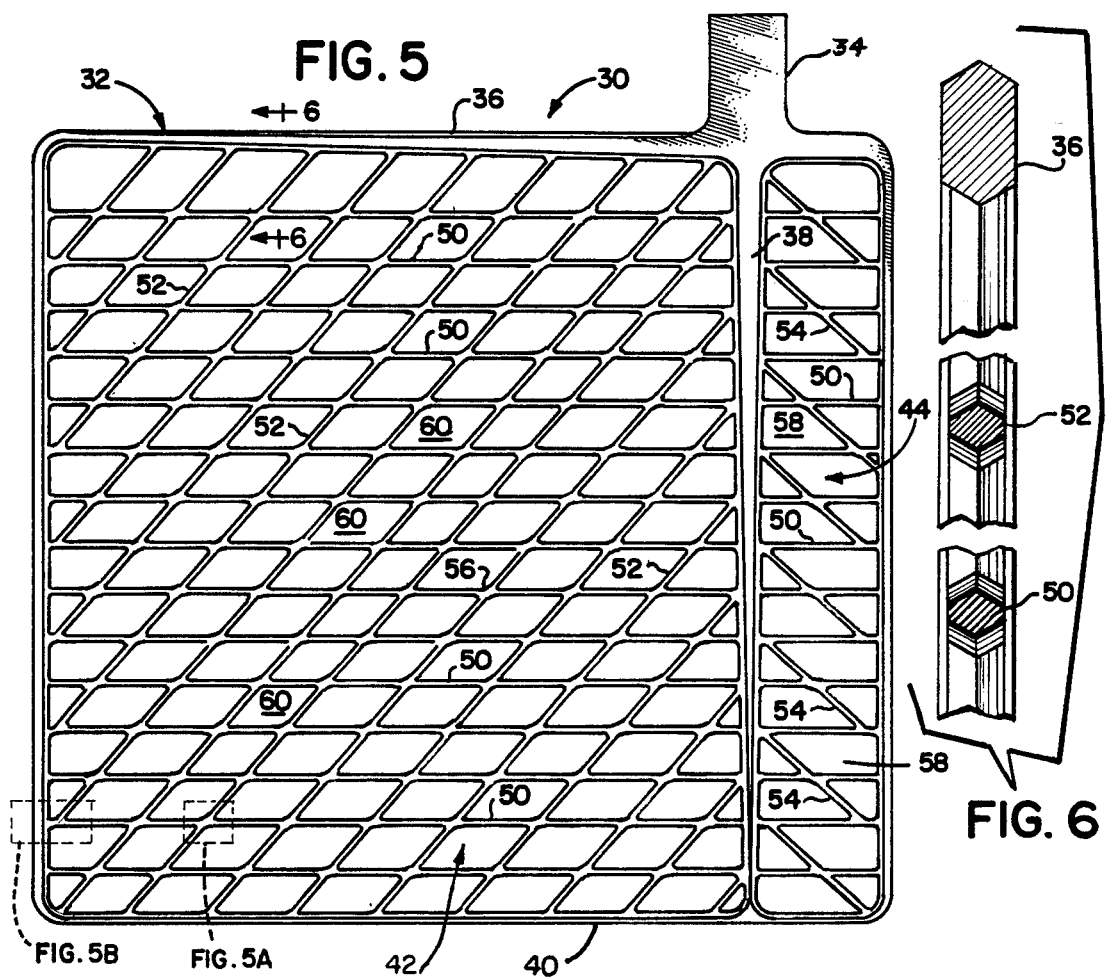
FIG. 5 is a elevated view of an alternative embodiment of a battery grid made in accordance with the teachings of the present invention.

Referring to FIG. 1, the battery grid 10 generally includes a generally rectangular frame 12 having a lug 14 projecting therefrom. A network 15 of grid wires defines a plurality of interstices 25 and provides the structure required to support active material as shown at 16 which is pasted on the grid to form a battery plate. The portions of the active material which fills the interstices in the grid wire network are called "pellets". Accordingly, the spacing and layout of the grid wires defines the size and shape of the "pellets".

The grid wire network 15 is comprised of grid wires 18 and 20 which lie in a common plane. All the grid wires, 18 and 20, have a substantially uniform hexagonal cross-section which is thinner than the rectangular frame 12. As can be seen in FIGS. 3 and 4, the grid wire network is recessed within the frame 12 so that a continuous surface of active material 16 may be formed on both sides of the grid wire network without extending substantially beyond the plane of the frame (FIG. 1). As discussed in detail below with reference to FIG. 1A, the design of the grid wire intersections 22 permits the grid wires to be relatively thin and easily cast.

The grid wires within the network are geometrically disposed in two arrays of parallel wires. The grid wires 18 of the first array extend horizontally, generally paralleling the lug side 21 of the frame 12. The grid wires 20 of the second array extend diagonally across the frame 12, and are sloped toward the projecting lug 14. The grid wires intersect at an angle between 45 to 50 degrees, preferably 47 to 48 degrees.

The diagonal wires 20 define a continuous series of uniform parallelogramatic interstices 25 between each pair of adjacent horizontal wires 18. In the preferred embodiment, both the horizontal and diagonal grid wires are substantially equally spaced so that the pellets of active material are substantially equal in size throughout the resulant battery plates. The uniform pellet size permits uniform collection and distribution of current between the active material and the grid wire network.

It will be recognized by those skilled in the art that the openings 26, and accordingly the pellets, adjacent the sides of the frame 12 are not full sized. However, this deviation does not detract from the benefits attributable to the uniformity of pellets shape and size throughout the remainder of the grid wire network.

In the preferred embodiment, the diagonal grid wires 20 intersect with the horizontal grid wires 18 at the sides of the frame; the diagonal grid wires 20 being spaced such that they intersect with alternate horizontal grid wires at each side of the frame 12.

The geometric arrangement of the disclosed grid network provides an efficient electrical conductor system for the active material pasted on the grid. The grid geometry provides uniform current collection around the perimeter of the grid. The grid frame 12 is designed such that the width of the frame sides 21, 23 increase as they converge to join with the lug 14. In addition, the diagonal wires 20 are symmetrically tapered, i.e., the longer ones joining the frame sides 21, 23 nearer the lug 14, having a greater width than the shorter wires farther from the lug. This design is based on the added cross-sectional area of each diagonal and its subsequent contribution of current towards the lug.

In addition to the novel geometry of the grid wire network, the intersections 22 between the grid wires 18, 20 have been designed to enhance both performance and castability of the grid. The grid wire intersections in the conventional prior art grid, shaded area of FIG. 2, networks are limited in both volume and surface area to the dimensions of the respective grid wires.

With reference to FIG. 1A, the intersections 22 of the grid wire network are oversized to provide both a larger surface area and greater internal volume. The normal grid wire intersection (indicated in phantom) would have a surface area of approximately 1.29 mm$^2$ and volume of approximately 0.297 mm$^3$. In the preferred embodiment the intersection surface area is increased by approximately 7½ times to 9.69 mm$^2$ and the intersection volume is increased approximately 10 times to approximately 2.98 mm$^3$.

The dimensions of the intersection are increased by selectively filling in the angles "o", as defined by the grid wires. The obtuse angles "o" between the grid wires are filled flat such that the width W of the filled area is approximately 50% to 150% greater than the combined width of the intersecting wires, preferably 75% to 100% greater. The acute angles "a" between the grid wires are concavely filled. Thus, the intersections are elongated with curved ends. The curvature streamlines the design of the intersection and provides a more uniform conducting surface for current to and from the active material.

Still with reference to FIG. 1A, the intersections 27, 28 between the frame 12 and the grid network are also enlarged in a similar fashion. The intersections 27 defined by two intersecting wires 18, 20 and the frame 12 having a width, W1, 50% to 150% greater than the combined grid wires, 18 and 20, and preferably 75% to 100% greater. The intersections 28, defined by a single grid wire and the frame 12, are flared by concavely filling the angles defined by the intersection thereof.

The larger surface area of the intersections reduces the internal resistance by providing greater contact with the active material thereby increasing electrical efficiency of the resultant battery plate. Since the contact area at the intersection is increased, the size of the grid wires can be reduced without changing the overall contact surface area between the grid wire network and the active material.

The increased volume of the intersections 24 enhances castability since the flow of molten lead along the two intersecting grid wires into the intersection is not restricted as in the conventional design. Also, the shape of the intersections 22 eliminates sharp angles thereby enhancing the flow therethrough and the filling thereof during casting. The increased surface area combined with the improved castability of the intersections permits the dimensions of the grid wires to be reduced, thereby reducing the overall grid weight and the amount of metal used in grid fabrication. Also small wire size permits the thickness of the grid to be reduced so that more battery plates may be utilized in a standard-sized cell thereby increasing the power of the resultant battery.

An alternate embodiment of the inventive battery grid is shown in FIG. 5. The battery grid 30 generally comprises a rectangular frame 32 having a lug 34 projecting from the top side 36 of the frame 32. The lug 34 is offset from the corner of the frame and a cross member 38 extends from the lug to the opposite side 40 of the frame 32 partitioning the frame into two rectangular sections 42 and 44.

Figures 5A, 5B, 6:
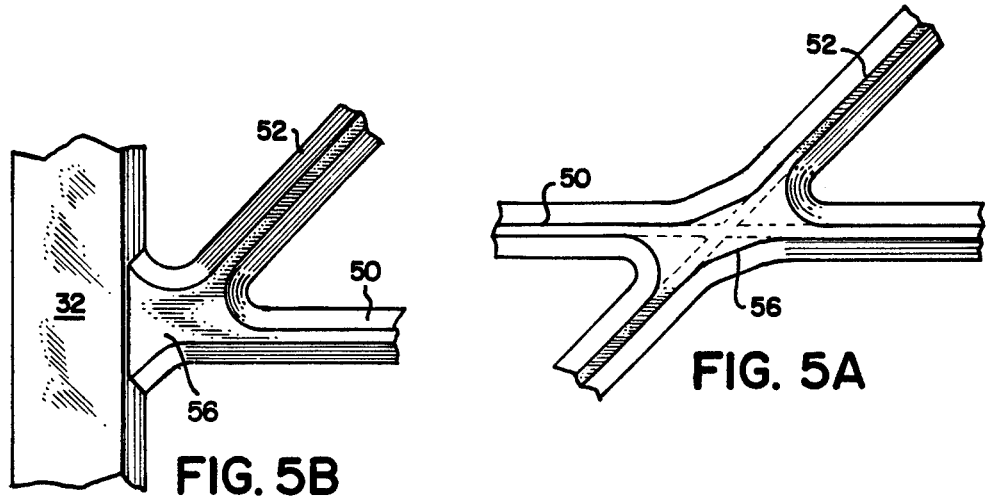
FIG. 5A is an enlarged view of that portion of the battery grid as shown in FIG. 5.
FIG. 5B is an enlarged view of that portion of the battery grid as shown in FIG. 5.
FIG. 6 is a fragmentary sectional view taken along line 6—6 of the battery grid shown in FIG. 5.

A network of grid wires is disposed within the frame 32 comprising three arrays of substantially parallel grid wires. The grid wires 50 of the first array extend horizontally across the entire width of the frame paralleling the lug side 36 and are segmented by the partitioning member 38. The grid wires 52 of the second array diagonally extend across the first section 42 of the grid intersecting with the wires 50 of the first array and the partitioning member 38. The grid wires of the second array are sloped towards the lug 34 at an angle between 45° to 50°, and preferably 47° to 48° from the horizontal wires 50. The grid wires 54 of the third array diagonally extend across the second section 44 of the grid. The grid wires 54 of the third array also intersect with wires 50 of the first array and the partitioning member 38. These wires 54 are also sloped towards the lug 34, at an angle between 45° to 50°, and preferably 47° to 48°. Accordingly, the grid wires of the first and second arrays define a first subnetwork within the first frame section 42 and the grid wires of the first and third arrays define a second subnetwork within the second frame section 44. As best seen in FIGS. 5A and 5B, the intersections 56 of the grid wires are enlarged to provide better efficiency and castability as discussed above with reference to FIG. 1A. The grid wires of each array are preferably substantially equally spaced so as to provide substantially uniform pellet size of active material within each of the frame sections 42, 44. With respect to the second section 44, due to the narrowness of that section, pentagonal openings 58 are defined therein which are substantially equally in size to the parallelogramatic interstices 60 defined in first section 42.

In the preferred embodiment, the diagonal wires 52, 54, the frame 32, and the partitioning cross member 38 are all slightly tapered away from the lug 34 to achieve better electrical performance as discussed above. Also, the diagonal wires 52, 54 intersect with the horizontal wires 50 at the frame 32 and partitioning cross member 38. To provide efficient interaction of the two sub-networks of grid wires, the diagonal wires 52, 54 of the respective subsections 42, 44 intersect with alternate horizontal grid wires 50 at the partitioning member 38. Accordingly, a more even flow of electrical current is achieved through the cross member 38 in the resultant battery plate.

We claim:

1. A battery grid comprising:
a rectangular frame having a lug projecting from one side thereof;
said lug located between the center and one end of said side;

a partition member extending from said lug across said frame such that said frame is partitioned into first and second rectangular sections; and a planar network of intersecting grid wires within said frame including:

a first array of substantially parallel wires extending across said frame and parallel with the lug side of said frame;

a second array of substantially parallel wires extending diagonally across said first rectangular frame section and such that the wires of said second array are sloped toward said lug; and a third array of substantially parallel wires diagonally extending across said second rectangular section such that the wires of said third array are sloped toward said lug; wherein the grid wires of said second and third arrays intersect with alternate grid wires of said first array at said partition member.

2. A battery grid according to claim 1 wherein grid wires of said first array are substantially equally spaced.

3. A battery grid according to claim 2 wherein the grid wires of said second and third arrays are substantially equally spaced.

4. A battery grid according to claim 3 wherein:
said network of intersecting grid wires lie in a common plane; and
the angles of intersections of said grid wires are selectively filled thereby increasing the surface area and volume of said intersections.

5. A battery grid according to claim 4 wherein:
the surface area of said grid wire intersections is increased from approximately 1.29 mm$^2$ to approximately 9.69 mm$^2$; and
the volume of said grid wire intersections is increased from approximately 0.297 mm$^3$ to approximately 2.97 mm$^3$.

6. A battery grid according to claim 3 wherein the angle of intersection between grid wires of said first array and grid wires of said second and third arrays is 47 to 48 degrees.

7. The battery grid according to claim 6 wherein the grid wires of said second and third arrays intersect with grid wires of said first array at said frame and at said partition member.

8. The battery grid according to claim 7 wherein said frame, said partition member, and said grid wires are tapered away from said lug.

9. A battery grid according to claim 8 wherein said network of grid wires is thinner than said frame and recessed therein.

10. A battery grid according to claim 1 wherein:
said network of intersecting grid wires lie in a common plane; and
the angles of intersections of said grid wires are selectively filled thereby increasing the surface area and volume of said intersections.

11. A battery grid according to claim 10 wherein:
the surface area of said grid wire intersections is increased from approximately 1.29 mm$^2$ to approximately 9.69 mm$^2$; and
the volume of said grid wire intersections is increased from approximately 0.297 mm$^3$ to approximately 2.97 mm$^3$.

12. A battery grid according to claim 1 wherein the angle of intersection between grid wires of said first array and grid wires of said second and third arrays is 47 to 48 degrees.

13. The battery grid according to claim 1 wherein said frame, said partition member, and said grid wires are tapered away from said lug.

14. A battery grid according to claim 1 wherein said network of grid wires is thinner than said frame and recessed therein.

* * * * *